US011942044B2

(12) United States Patent
Huang et al.

(10) Patent No.: US 11,942,044 B2
(45) Date of Patent: Mar. 26, 2024

(54) PIXEL COMPENSATION METHOD, PIXEL COMPENSATION DEVICE AND DISPLAY DEVICE

(71) Applicant: HKC CORPORATION LIMITED, Shenzhen (CN)

(72) Inventors: Xueyong Huang, Shenzhen (CN); Haoxuan Zheng, Shenzhen (CN)

(73) Assignee: HKC CORPORATION LIMITED, Shenzhen (CN)

(*) Notice: Subject to any disclaimer, the term of this patent is extended or adjusted under 35 U.S.C. 154(b) by 0 days.

(21) Appl. No.: 18/145,377

(22) Filed: Dec. 22, 2022

(65) Prior Publication Data

US 2023/0419911 A1 Dec. 28, 2023

(30) Foreign Application Priority Data

Jun. 28, 2022 (CN) ......................... 202210741595.0

(51) Int. Cl.
*G09G 3/3275* (2016.01)
*G09G 3/20* (2006.01)
*G09G 3/3233* (2016.01)

(52) U.S. Cl.
CPC ......... *G09G 3/3275* (2013.01); *G09G 3/2096* (2013.01); *G09G 3/3233* (2013.01);
(Continued)

(58) Field of Classification Search
CPC .. G09G 3/3275; G09G 3/2096; G09G 3/3233; G09G 2300/0828;
(Continued)

(56) References Cited

U.S. PATENT DOCUMENTS

2001/0024186 A1 9/2001 Kane et al.
2007/0030192 A1* 2/2007 Son .......................... G09G 3/20 341/156
(Continued)

FOREIGN PATENT DOCUMENTS

CN 105047137 A 11/2015
CN 105741783 A 7/2016
(Continued)

OTHER PUBLICATIONS

CNIPA, Office Action for CN Application No. 202210741595.0, dated May 10, 2023 (see X/Y/A designations on p. 8).

*Primary Examiner* — Amare Mengistu
*Assistant Examiner* — Jennifer L Zubajlo
(74) *Attorney, Agent, or Firm* — Hodgson Russ LLP

(57) ABSTRACT

A pixel compensation method includes determining an actual driving digital voltage of each organic light-emitting sub-pixel in a detection row; performing mean value calculation based on the actual driving digital voltage of each organic light-emitting sub-pixel in the detection row to determine an average driving digital voltage corresponding to the detection row; calculating a voltage difference between the actual driving digital voltage of the organic light-emitting sub-pixel in the detection row and the average driving digital voltage, and counting the voltage differences to form a voltage difference set; and outputting a corresponding data compensation analog voltage to the organic light-emitting sub-pixel in the detection row when an absolute value of a maximum voltage difference in the voltage difference set is greater than or equal to a target threshold. The pixel compensation method of this disclosure can improve the uneven display and improve the display effect.

20 Claims, 4 Drawing Sheets

(52) U.S. Cl.
CPC ............... *G09G 2300/0828* (2013.01); *G09G 2300/0842* (2013.01); *G09G 2320/0233* (2013.01); *G09G 2320/043* (2013.01)

(58) Field of Classification Search
CPC ... G09G 2300/0842; G09G 2320/0233; G09G 2320/043
See application file for complete search history.

(56) References Cited

U.S. PATENT DOCUMENTS

| | | | | |
|---|---|---|---|---|
| 2008/0111773 | A1 | 5/2008 | Tsuge | |
| 2009/0256854 | A1 | 10/2009 | Mizukoshi et al. | |
| 2016/0189615 | A1* | 6/2016 | Kwon .................. | G09G 3/3233 345/76 |
| 2017/0154940 | A1 | 6/2017 | Yamazaki et al. | |
| 2017/0178586 | A1* | 6/2017 | Kim ....................... | G09G 3/003 |
| 2021/0104195 | A1* | 4/2021 | Choi .................... | G09G 3/3258 |
| 2021/0272524 | A1* | 9/2021 | Kim ..................... | G09G 3/3275 |
| 2021/0375207 | A1* | 12/2021 | Chen .................... | G09G 3/3233 |

FOREIGN PATENT DOCUMENTS

| | | | | | |
|---|---|---|---|---|---|
| CN | 106531049 | A | * | 3/2017 | ............... G09G 3/20 |
| CN | 106531049 | A | | 3/2017 | |
| CN | 106782306 | A | * | 5/2017 | ........... G09G 3/3208 |
| CN | 106782306 | A | | 5/2017 | |
| CN | 107633810 | A | | 1/2018 | |
| CN | 108269525 | A | | 7/2018 | |
| CN | 110349542 | A | | 10/2019 | |
| JP | 2003280590 | A | | 10/2003 | |

* cited by examiner

PIXEL COMPENSATION METHOD, PIXEL COMPENSATION DEVICE AND DISPLAY DEVICE

CROSS-REFERENCE TO RELATED APPLICATIONS

This application claims priority to Chinese Patent Application No. 202210741595.0, filed Jun. 28, 2022, the entire disclosure of which is incorporated herein by reference.

FIELD OF TECHNOLOGY

The present disclosure relates to the display field, more particularly, to a pixel compensation method, a pixel compensation device and a display device.

BACKGROUND

With the continuous development of display field, organic light-emitting display (OLED) technology has been widely used in TV, mobile phone, notebook computer and other products due to its advantages of self-luminescence and thinness. However, in OLED display, the threshold voltage Vth of the driving transistor of some sub-pixels will shift seriously due to factors such as process or aging, which will lead to great changes in the current flowing through the organic light-emitting diodes, resulting in obvious display unevenness and affecting the display effect.

SUMMARY

There are provided a pixel compensation method, a pixel compensation device and a display device according to embodiments of the present disclosure. The technical solution is as below:

According to a first aspect of the present disclosure, there is provided a pixel compensation method, for a display panel which includes a plurality of rows of organic light-emitting sub-pixel groups including a plurality of organic light-emitting sub-pixels arranged in a column direction. At least one of the plurality of rows of organic light-emitting sub-pixel groups is a detection row. The pixel compensation method includes:

- determining an actual driving digital voltage of each of the organic light-emitting sub-pixels in a detection row;
- performing mean value calculation based on the actual driving digital voltage of each of the organic light-emitting sub-pixels in the detection row to determine an average driving digital voltage corresponding to the detection row;
- calculating a voltage difference between the actual driving digital voltage of each of the organic light-emitting sub-pixels in the detection row and the average driving digital voltage, and counting the voltage differences to form a voltage difference set; and
- outputting a corresponding data compensation analog voltage to each of the organic light-emitting sub-pixels in the detection row when an absolute value of a maximum voltage difference in the voltage difference set is greater than or equal to a target threshold.

According to a second aspect of the present disclosure, there is provided a pixel compensation device for compensating a display panel, which includes a plurality of rows of organic light-emitting sub-pixel groups including a plurality of organic light-emitting sub-pixels arranged in a column direction. At least one of the plurality of rows of organic light-emitting sub-pixel groups is a detection row. The pixel compensation device includes:

- a data driver configured to determine an actual driving digital voltage of each of the organic light-emitting sub-pixels in the detection row;
- a timing controller configured to perform mean value calculation based on the actual driving digital voltage of each of the organic light-emitting sub-pixels in the detection row to determine an average driving digital voltage corresponding to the detection row; further configured to calculate a voltage difference between the actual driving digital voltage of each of the organic light-emitting sub-pixels in the detection row and the average driving digital voltage, and to count the voltage differences to form a voltage difference set; and
- the data driver further configured to output a corresponding data compensation analog voltage to each of the organic light-emitting sub-pixels in the detection row when an absolute value of a maximum voltage difference in the voltage difference set is greater than or equal to a target threshold.

According to a third aspect of the present disclosure, there is provided a display device including:

- a display panel comprising a plurality of rows of organic light-emitting sub-pixel groups comprising a plurality of organic light-emitting sub-pixels arranged in a column direction, wherein at least one of the plurality of rows of organic light-emitting sub-pixel groups is a detection row; and
- a data driver connected to the organic light-emitting sub-pixel, and configured to determine an actual driving digital voltage of each of the organic light-emitting sub-pixels in the detection row;
- a timing controller connected to the organic light-emitting sub-pixel, wherein the timing controller is configured to perform mean value calculation based on the actual driving digital voltage of each of the organic light-emitting sub-pixels in the detection row to determine an average driving digital voltage corresponding to the detection row; further configured to calculate a voltage difference between the actual driving digital voltage of each of the organic light-emitting sub-pixels in the detection row and the average driving digital voltage, and to count the voltage differences to form a voltage difference set; and further configured to calculate a corresponding data compensation analog voltage to each of the organic light-emitting sub-pixels in the detection row when an absolute value of a maximum voltage difference in the voltage difference set is greater than or equal to a target threshold; and
- the data driver is further configured to perform digital-to-analog conversion on the data compensation digital voltage to convert the data compensation digital voltage into the data compensation analog voltage, and to output a matched data compensation analog voltage to each of the organic light-emitting sub-pixels in the detection row.

It should be understood that the above general description and the following detailed description are exemplary and explanatory only and are not intended to limit the present disclosure.

BRIEF DESCRIPTION OF THE DRAWINGS

The accompanying drawings, which are incorporated in and constitute a part of the specification, illustrate embodiments consistent with the present disclosure and, together with the description, serve to explain the principles of the present disclosure. Obviously, the drawings in the following description are merely some embodiments of the present disclosure, from which other drawings may be obtained without exerting inventive effort by those ordinarily skilled in the art.

DETAILED DESCRIPTION OF THE EMBODIMENTS

The exemplary embodiments will now be described more fully with reference to the accompanying drawings. However, the example embodiments can be implemented in a variety of forms and should not be construed as being limited to the examples set forth herein. Rather, these embodiments are provided so that the present disclosure will be more comprehensive and complete, and the concept of example embodiments will be fully communicated to those skilled in the art.

Further, the described features, structures or characteristics may be incorporated in any suitable manner in one or more embodiments. In the following description many specific details are provided to give a full understanding of the embodiments of the present disclosure. However, those skilled in the art will appreciate that the technical aspects of the present disclosure may be practiced without one or more of the specific details, or other methods, components, devices, steps and the like may be employed. In other instances, the common methods, device, implementations or operations are not shown or described in detail to avoid obscuring aspects of the present disclosure.

The present disclosure is further described below with reference to the accompanying drawings and specific embodiments. It should be noted that the technical features involved in the different embodiments of the present disclosure described below can be combined mutually in case of no conflict. The following embodiments described with reference to the drawings are illustrative and only used to explain the present disclosure, but may not be interpreted as the restrictions of the present disclosure.

Embodiment 1

The embodiment of the present disclosure provides a pixel compensation method, which can be used for a display panel. The display panel includes a plurality of rows of organic light-emitting sub-pixel groups. The organic light-emitting sub-pixel group includes a plurality of organic light-emitting sub-pixels arranged in a column direction, and at least one of the plurality of rows of organic light-emitting sub-pixel groups is a detection row.

Figure 1:
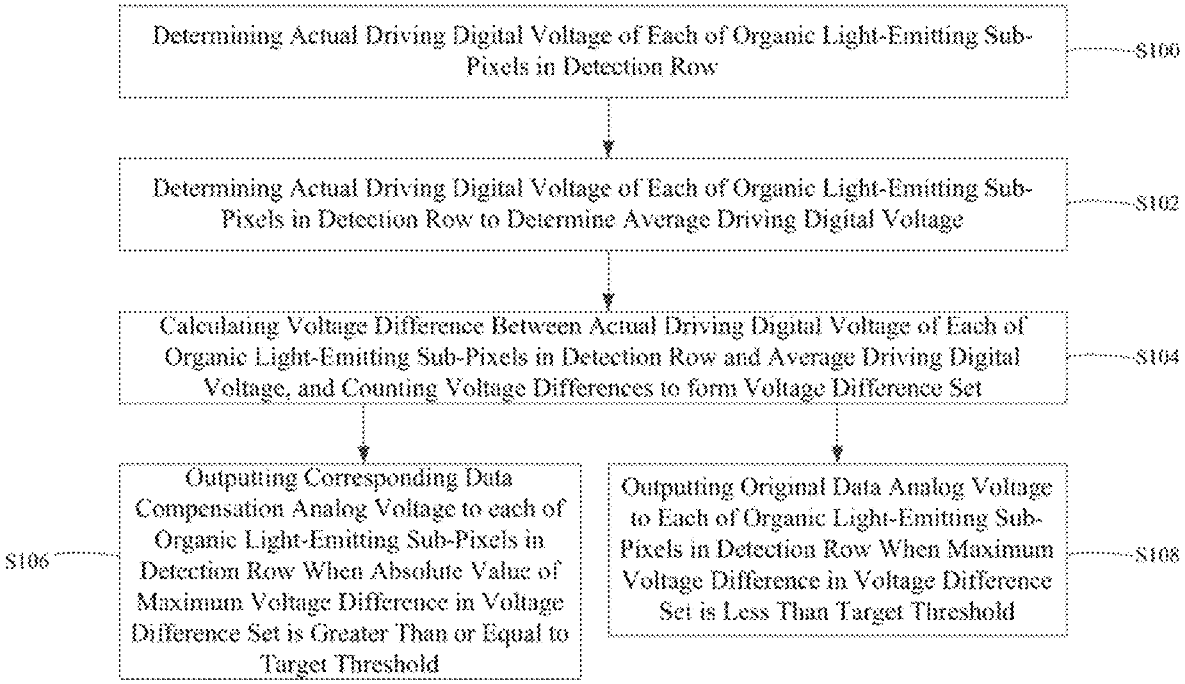
FIG. 1 is a flow diagram of a pixel compensation method described in embodiment 1 of the present disclosure.

As shown in FIG. 1, the pixel compensation method of this embodiment may include step S100, step S102, step S104, step S106 and step S108.

In step S100, the actual driving digital voltage of each organic light-emitting sub-pixel in the detection row is determined. That is, a plurality of actual driving digital voltages can be acquired in this step, each of which corresponds to one organic light-emitting sub-pixel, and it should be understood that the actual driving digital voltages of each organic light-emitting sub-pixel may be the same or different.

Figure 2:
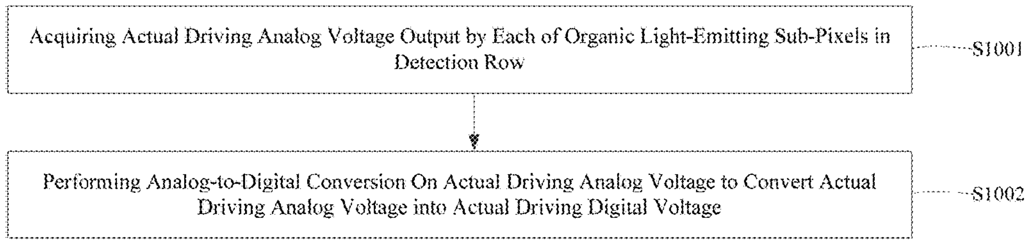
FIG. 2 is a flow diagram of step S100 in FIG. 1.

Specifically, as shown in FIG. 2, step S100 may include:

step S1001, obtaining the actual driving analog voltage output by each organic light-emitting sub-pixel in the detection row; and step S1002, performing analog-to-digital conversion on the actual driving analog voltage to convert the actual driving analog voltage into the actual driving digital voltage.

In step S102, a mean value calculation is performed based on the actual driving digital voltage of each organic light-emitting sub-pixel in the detection row to determine the average driving digital voltage corresponding to the detection row. For example, when there is one detection row, and the detection row includes N organic light-emitting sub-pixels, N actual driving digital voltages can thus be acquired, and the N actual driving digital voltages are summed and divided by N, that is, the average driving digital voltage corresponding to the detection row can be obtained. When M detection rows are provided, and each detection row includes N organic light-emitting sub-pixels, M×N actual driving digital voltages can thus be acquired, and the M×N actual driving digital voltages are summed and divided by M×N, i.e., the average driving digital voltages corresponding to the M detection rows can be obtained.

It should be understood that this N, M are integers greater than 1.

In step S104, a voltage difference between the actual driving digital voltage of each organic light-emitting sub-pixel in the detection row is calculated and the average driving digital voltage, and each voltage difference is counted to form a voltage difference set. It should be understood that when the actual driving digital voltage of each organic light-emitting sub-pixel in the detection row is different, the voltage difference in the voltage difference set may be positive and negative, or even may be zero.

In step S106, when the absolute value of the maximum voltage difference in the voltage difference set is greater than or equal to the target threshold, a data compensation analog voltage corresponding thereto is output to each organic light-emitting sub-pixel in the detection row.

It should be noted that, the brightness difference corresponding to this target threshold is visible for human naked eyes, therefore, when the absolute value of the maximum voltage difference in the voltage difference set is greater than or equal to the target threshold, it shows that the threshold voltage Vth of the organic light-emitting sub-pixel corresponding to the maximum voltage difference shifts seriously, the display brightness is obviously abnormal and the display is uneven, in this case, data compensation is needed for the display panel, and the corresponding data compensation analog voltage can be output to the organic light-emitting sub-pixels to balance the luminous brightness of each organic light-emitting sub-pixel, thereby improving the display unevenness and enhancing the display effect.

Figure 3:
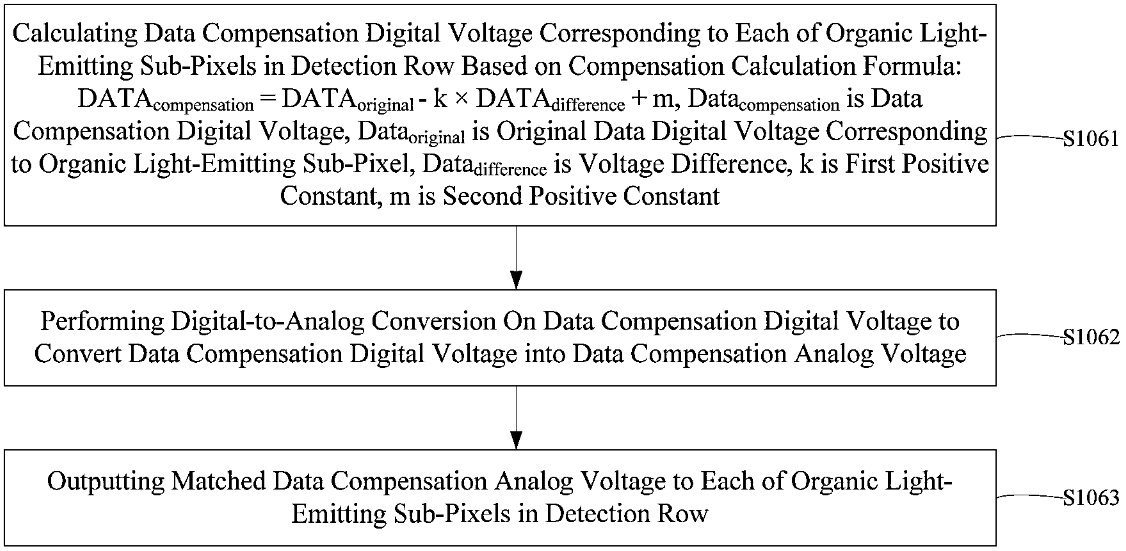
FIG. 3 is a flow diagram of step S106 in FIG. 1.

Specifically, as shown in FIG. 3, step S106 may include:

step S1061, calculating a data compensation digital voltage corresponding to each of the organic light-emitting sub-pixels in the detection row based on a compensation calculation formula of $DATA_{compensation}=DATA_{original}-k\times DATA_{difference}+m$, where $DATA_{compensation}$ is the data compensation digital voltage, $DATA_{original}$ is an original data digital voltage corresponding to the organic light-emitting sub-pixel, $DATA_{difference}$ is the voltage difference, k is a first positive constant, and m is a second positive constant;

step S1062, performing digital-to-analog conversion on the data compensation digital voltage to convert the data compensation digital voltage into the data compensation analog voltage; and step S1063: outputting a matched data compensation analog voltage to each of the organic light-emitting sub-pixels in the detection row.

It should be understood that, when the voltage difference $DATA_{difference}$ is negative, it shows that the actual driving digital voltage corresponding to the organic light-emitting sub-pixel is less than the average driving digital voltage. In order to make the actual driving digital voltage corresponding to the organic light-emitting sub-pixels closer to the average driving digital voltage, the data compensation digital voltage supplied to the organic light-emitting sub-pixel needs to be larger than the original data digital voltage, so that the data compensation analog voltage acquired by the organic light-emitting sub-pixel needs to be larger than the original data digital analog voltage.

When the voltage difference $DATA_{difference}$ is positive, it shows that the actual driving digital voltage corresponding to the organic light-emitting sub-pixel is greater than the average driving digital voltage. In order to make the actual driving digital voltage corresponding to the organic light-emitting sub-pixels closer to the average driving digital voltage, the data compensation digital voltage supplied to the organic light-emitting sub-pixel needs to be smaller than the original data digital voltage, so that the data compensation analog voltage acquired by the organic light-emitting sub-pixel needs to be smaller than the original data digital analog voltage.

In addition, when the voltage difference $DATA_{difference}$ is zero, it means that the actual driving digital voltage corresponding to the organic light-emitting sub-pixel is equal to the average driving digital voltage, indicating that compensation is not needed, and proceeding to provide original data digital analog voltage to the organic light-emitting sub-pixel.

For example, the first positive constant k is determined based on an adjustment of line loss during the acquisition of the actual driving analog voltage, and the second positive constant m is determined based on an adjustment of conversion error during the analog-to-digital conversion. That is to say, the pixel compensation method of this embodiment can not only compensate the threshold voltage Vth of the driving transistor in the organic light-emitting sub-pixel, but also compensate the line loss and the conversion error, and can enhance the display brightness while improving the display uneven problem.

In this embodiment, the first positive constant k is 1, and the second positive constant m is 0. That is to say, the pixel compensation method of this embodiment can only compensate the threshold voltage Vth of the driving transistor in the organic light-emitting sub-pixel, without considering the compensation of other external losses and conversion errors, since there will be certain line loss and conversion error in detecting each organic light-emitting sub-pixel, but the line loss and conversion error are basically the same in each detection. That is to say, the line loss and conversion error are relatively balanced, as long as the threshold voltage Vth of the driving transistor in the organic light-emitting sub-pixel is compensated, even if the line loss and conversion error are not compensated, there is basically no obvious abnormal display brightness, so that the naked eye can hardly see the display unevenness, that is, the display effect is good, also the computational complexity of the compensation method and the energy consumption in the compensation process can be reduced.

In step S108, when the maximum voltage difference in the voltage difference set is smaller than the target threshold, the original data analog voltage is output to each organic light-emitting sub-pixel in the detection row.

That is to say, when the absolute value of the maximum voltage difference in the voltage difference set is less than the target threshold, it shows that the detected threshold voltage Vth of each organic light-emitting sub-pixel basically does not shift, or even if the threshold voltage Vth shifts, the overall offset is relatively balanced, thus there is no obvious abnormal display brightness, so that the naked eye can hardly see the display unevenness, that is, the display effect is good. At this time, the corresponding original data analog voltage can be continuously output to the organic light-emitting sub-pixels without data compensation, which can reduce the energy consumption required in the compensation process.

In this embodiment, the plurality of rows of organic light-emitting sub-pixel groups are provided with a plurality of detection lines arranged at equal intervals, that is to say, the pixel compensation method of the embodiment can be applied to detecting the plurality of rows of organic light-emitting sub-pixel groups, so that the problem of uniformity of display brightness can be better reflected and the compensation accuracy can be improved.

Embodiment 2

Figure 4:
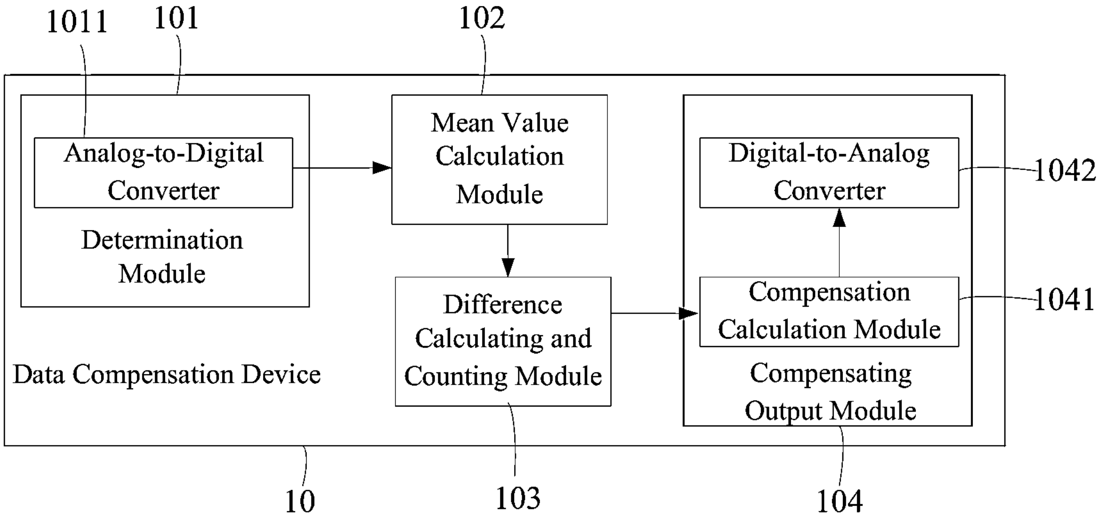
FIG. 4 is a structural block diagram of a pixel compensation device described in embodiment 2 of the present disclosure.

Embodiment 2 provides a pixel compensation device for compensating a display panel, and the pixel compensation device is used for implementing the pixel compensation method described in embodiment 1. Specifically, as shown in FIG. 4, the pixel compensation device may include a determination module 101, a mean value calculation module 102, a difference calculating and counting module 103 and a compensation output module 104 connected in sequence.

The determination module 101 is configured to determine an actual driving digital voltage of each of the organic light-emitting sub-pixels in the detection row.

The mean value calculation module 102 is configured to perform mean value calculation based on the actual driving digital voltage of each of the organic light-emitting sub-pixels in the detection row to determine an average driving digital voltage corresponding to the detection row.

The difference calculating and counting module 103 is configured to calculate a voltage difference between the actual driving digital voltage of each of the organic light-emitting sub-pixels in the detection row and the average driving digital voltage, and to count the voltage differences to form a voltage difference set.

The compensation output module 104 is configured to output a corresponding data compensation analog voltage to each of the organic light-emitting sub-pixels in the detection row when an absolute value of a maximum voltage difference in the voltage difference set is greater than or equal to a target threshold.

The compensation output module 104 is also configured to output the original data analog voltage to each organic light-emitting sub-pixel in the detection row when the maximum voltage difference in the voltage difference set is less than the target threshold.

Specifically, as shown in FIG. 4, the determination module 101 may include an analog-to-digital converter (ADC) 1011 for acquiring an actual driving analog voltage output by each organic light-emitting sub-pixel in the detection row and performing analog-to-digital conversion on the actual driving analog voltage to convert the actual driving analog voltage into the actual driving digital voltage. It is understood that the determination module 101 may also include transfer traces connecting the analog-to-digital converter 1011 with the organic light-emitting sub-pixels and the like.

As shown in FIG. 4, the compensation output module 104 may include a compensation calculation module 1041 and a digital-to-analog converter (DAC) 1042 connected to each other. The compensation calculation module 1041 is configured to calculate a data compensation digital voltage corresponding to each of the organic light-emitting sub-pixels in the detection row based on a compensation calculation formula of $DATA_{compensation}=DATA_{original}-k\times DATA_{difference}+m$, where $DATA_{compensation}$ is the data compensation digital voltage, $DATA_{original}$ is an original data digital voltage corresponding to the organic light-emitting sub-pixel, $DATA_{difference}$ is the voltage difference, k is a first positive constant, and m is a second positive constant. The digital-to-analog converter 1042 is configured to perform digital-to-analog conversion on the data compensation digital voltage to convert the data compensation digital voltage into the data compensation analog voltage, and output a matched data compensation analog voltage to each of the organic light-emitting sub-pixels in the detection row.

When the maximum voltage difference in the voltage difference set is less than the target threshold, the compensation calculation module 1041 does not need to compensate the voltage again, and directly outputs the original data analog voltage to each organic light-emitting sub-pixel in the detection row, thus reducing the energy consumption required in the compensation process.

It should be noted that other contents related to embodiment 1 of the pixel compensation device of this embodiment can be referred to the description of embodiment 1 and will not be repeated here.

Embodiment 3

Figure 5:
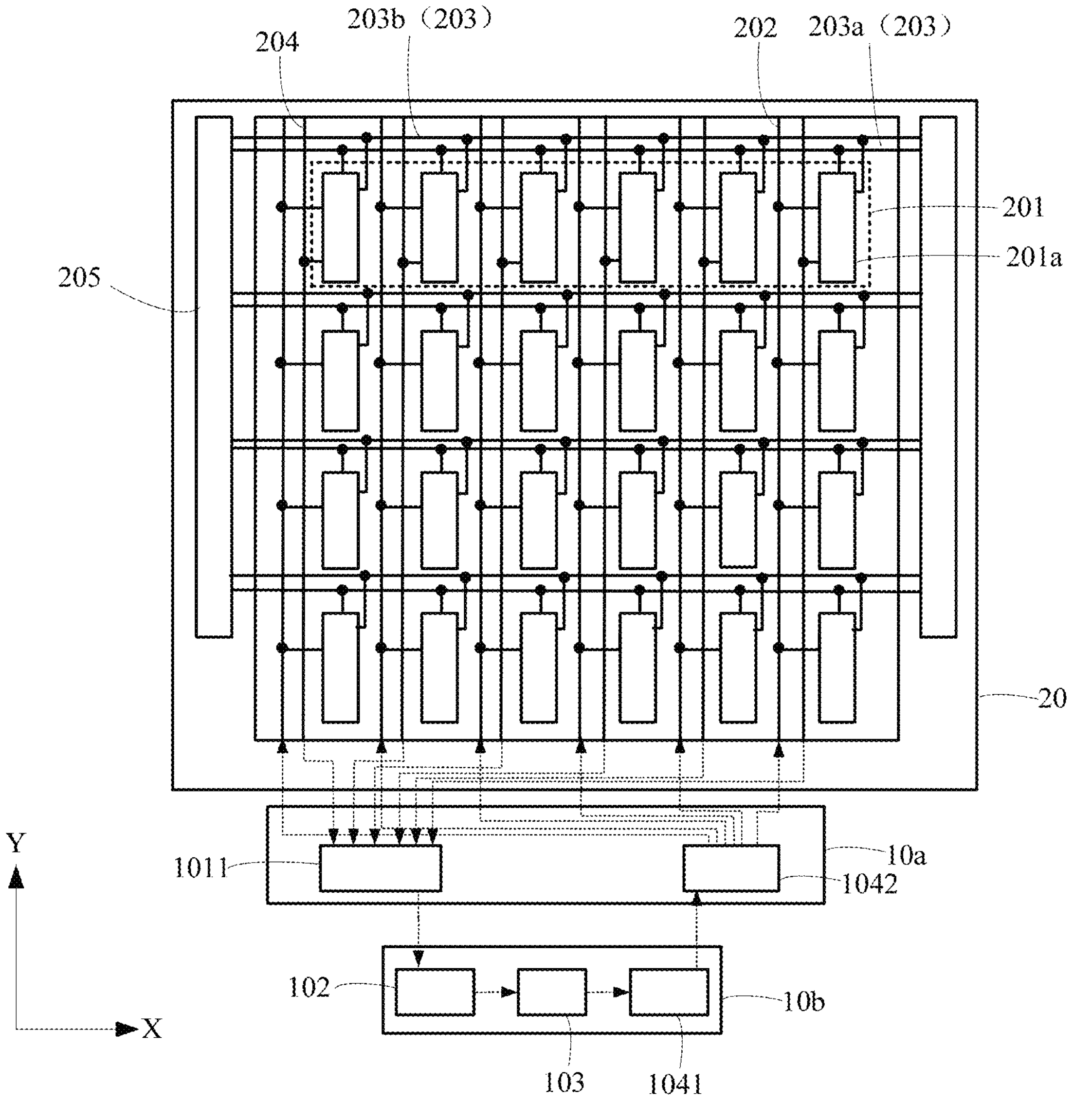
FIG. 5 is a structural schematic diagram of a display device described in embodiment 3 of the present disclosure.

This embodiment provides a display device including a display panel 20, a data driver 10*a* and a timing controller 10*b*, as shown in FIG. 5.

As shown in FIG. 5, the display panel 20 includes a plurality of rows of organic light-emitting sub-pixel groups 201. The organic light-emitting sub-pixel group 201 includes a plurality of organic light-emitting sub-pixels 201*a* arranged in a column direction Y, and at least one of the plurality of rows of organic light-emitting sub-pixel groups 201 is a detection row. The display panel 20 may also include a plurality of columns of data lines 202 and a plurality of rows of scan lines 203. The data lines 202 and the scan lines 203 crisscross define a plurality of sub-pixel areas arranged in a row direction X and the column direction Y, and each organic light-emitting sub-pixel 201*a* is corresponding to one of the sub-pixel areas.

In this embodiment, the data driver 10*a* and the timing controller 10*b* are respectively connected to the organic light-emitting sub-pixels 201*a*, and the data driver 10*a* and the timing controller 10*b* as a whole may correspond to the data compensation device 10 mentioned in embodiment 2.

The data driver 10*a* may be configured to determine an actual driving digital voltage of each of the organic light-emitting sub-pixels 201*a* in the detection row. The timing controller 10*b* may be configured to perform mean value calculation based on the actual driving digital voltage of each of the organic light-emitting sub-pixels 201*a* in the detection row to determine an average driving digital voltage corresponding to the detection row. The timing controller 10*b* is further configured to calculate a voltage difference between the actual driving digital voltage of each organic light-emitting sub-pixel 201*a* in the detection row and the average driving digital voltage, and count the voltage differences to form a voltage difference set. The timing controller 10*b* is further configured to calculate a corresponding data compensation analog voltage to each of the organic light-emitting sub-pixels 201*a* in the detection row when an absolute value of a maximum voltage difference in the voltage difference set is greater than or equal to a target threshold. The data driver 10*a* is further configured to perform digital-to-analog conversion on the data compensation digital voltage to convert the data compensation digital voltage into the data compensation analog voltage, and to output a matched data compensation analog voltage to each of the organic light-emitting sub-pixels 201*a* in the detection row.

For example, the data driver 10*a* includes an analog-to-digital converter 1011 and a digital-to-analog converter 1042 connected to the timing controller 10*b*, respectively. The functions of the digital-to-analog converter 1042 and the analog-to-digital converter 1011 of this embodiment may be referred to what is described in the pixel compensation device in embodiment 2, and will not be repeated here. It should be understood that the digital-to-analog converter 1042 mentioned in this embodiment and embodiment 2 may also perform digital-to-analog conversion on the original data digital voltage supplied by the timing controller 10*b* to convert the original data digital voltage into the original data analog voltage.

The timing controller 10*b* of this embodiment may include the mean value calculation module 102, the difference calculating and counting module 103, and the compensation calculation module 1041. The functions of the mean value calculation module 102, the difference calculating and counting module 103, and the compensation calculation module 1041 of this embodiment may be referred to what is described in the pixel compensation device of embodiment 2, and will not be repeated here.

For example, the organic light-emitting sub-pixel 201*a* of this embodiment may be of a 3T1C structure which, compared with 2T1C structure, is provided with another compensation transistor. The compensation transistor is turned on at startup or in a blanking state, and the actual driving analog voltage driving voltage is fed back to the analog-to-digital converter 1011. The actual driving analog voltage is converted by the analog-to-digital converter 1011 to obtain the actual driving digital voltage, and the organic light-emitting sub-pixel is compensated according to the obtained actual driving digital voltage value. The detail process can refer to the pixel compensation method described in embodiment 1, and will not be described in detail here.

Figure 6:
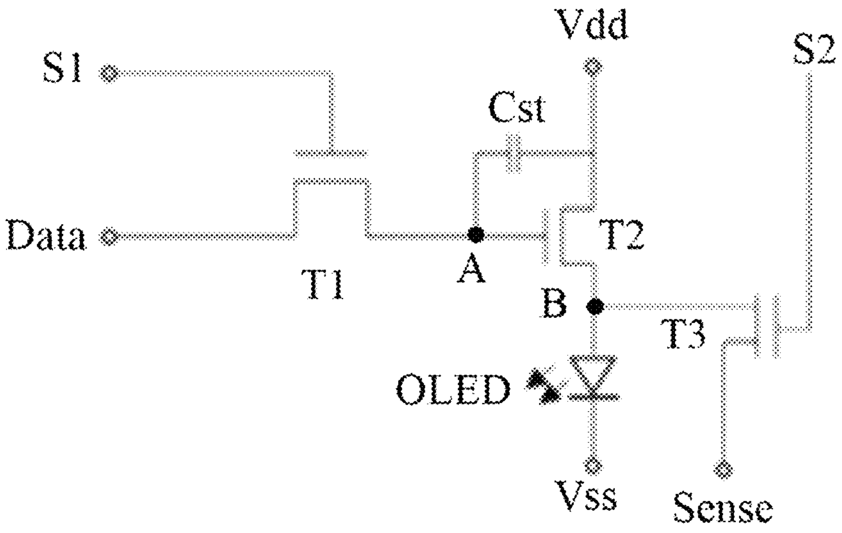
FIG. 6 is a circuit diagram of an organic light-emitting sub-pixel in FIG. 5.

Specifically, as shown in FIG. 6, the organic light-emitting sub-pixel 201*a* of this embodiment includes a data writing transistor T1, a driving transistor T2, a compensation transistor T3, a storage capacitor Cst, and an organic light-emitting diode OLED.

As shown in FIGS. 5 and 6, a first terminal of the data writing transistor T1 is connected to the digital-to-analog converter 1042 of the data driver 10*a* through a data line 202 for receiving the data compensation analog voltage or the original data analog voltage Data output by the digital-to-analog converter 1042.

A control terminal of the data writing transistor T1 is connected to a gate driver 205 through a first scan line 203*a* for receiving a first scan signal S1 provided by the first scan line 203*a*. It should be noted that the gate driver 205 may be integrated in a non-display area of the display panel 20 but is not limited thereto, and the gate driver 205 may be externally connected to the non-display area of the display panel 20.

A second terminal of the data writing transistor T1, a first terminal of the storage capacitor Cst and a control terminal of the driving transistor T2 are connected to a first node A.

A second terminal of the storage capacitor Cst and a first terminal of the driving transistor T2 are connected to a first power signal terminal for receiving the first power signal Vdd provided by the first power signal terminal.

A second terminal of the driving transistor T2, a first pole of the organic light-emitting diode OLED and a first terminal of the compensation transistor T3 are connected to a second node B.

A second pole of the organic light-emitting diode OLED is connected to a second power supply signal terminal for receiving a second power supply signal Vss provided by the second power supply signal terminal.

A control terminal of the compensation transistor T3 is connected to the gate driver 205 through a second scan line 203*b* for receiving a second scan signal S2 provided by the second scan line 203*b*, and a second terminal of the compensation transistor T3 is connected to the analog-to-digital converter 1011 of the data driver 10*a* through a compensation line 204.

The analog-to-digital converter 1011 of the data driver 10*a* is configured to acquire an actual driving analog voltage Sense at the second node B through the compensation line 204 when the data writing transistor T1 and the compensation transistor T3 are respectively turned on in response to the first scan signal S1 and the second scan signal S2, and to perform analog-to-digital conversion on the actual driving analog voltage Sense to convert the actual driving analog voltage into the actual driving digital voltage.

The display device of this embodiment can be applied to electronic devices such as televisions, mobile phones, tablets, notebook computers, etc.

The terms of "first", "second" and the like are for descriptive purposes only and cannot be construed as indicating or implying relative importance or implying the number of the indicated technical features. Thus, features defined with "first", "second" and the like may explicitly or implicitly include one or more of the features. In the description of the present disclosure, "multiple" means two or more unless otherwise expressly specified.

In the present disclosure, the terms "install", "connect" and the like are to be understood in a broad sense, unless otherwise expressly specified and limited, for example, it can be a fixed connection, may also be a detachable connection, or be integral; it can be a mechanical connection, can also be an electrical connection; it can be directly connection or indirectly connection through an intermediate medium, or it can be an internal connection of two elements or an interactive relationship of two elements. For those ordinarily skilled in the art, the specific meanings of the above terms in the present disclosure will be understood according to the specific circumstances.

In the content of the description, illustrations of the reference terms "one embodiment," "example," "specific example" etc. mean that specific features, structures, materials, or characteristics described in connection with the embodiment or example are encompassed in at least one embodiment or example of the present disclosure. In this description, the schematic formulation of the above terms need not be directed to the same embodiments or examples. Further, the specific features, structures, materials or characteristics described may be combined in a suitable manner in any one or more embodiments or examples. Further, without contradicting one another, those skilled in the art may connect and combine different embodiments or examples described in this description and features of different embodiments or examples.

Although embodiments of the present disclosure have been shown and described above, it will be understood that the above-mentioned embodiments are exemplary and cannot be construed as limiting the present disclosure. Those of ordinary skill in the art may make changes, variations, alternatives and modifications to the above-mentioned embodiments within the scope of the present disclosure. Therefore, any changes or modifications made in accordance with the claims and descriptions of the present disclosure should fall within the scope of the patent of the present disclosure.

What is claimed is:

1. A pixel compensation method, for a display panel which comprises a plurality of rows of organic light-emitting sub-pixel groups comprising a plurality of organic light-emitting sub-pixels arranged in a column direction, wherein at least one of the plurality of rows of organic light-emitting sub-pixel groups is a detection row, wherein the pixel compensation method comprises:

determining an actual driving digital voltage of each of the organic light-emitting sub-pixels in a detection row;

performing mean value calculation based on the actual driving digital voltage of each of the organic light-emitting sub-pixels in the detection row to determine an average driving digital voltage corresponding to the detection row;

calculating a voltage difference between the actual driving digital voltage of each of the organic light-emitting sub-pixels in the detection row and the average driving digital voltage, and counting the voltage differences to form a voltage difference set; and outputting a corresponding data compensation analog voltage to each of the organic light-emitting sub-pixels in the detection row when an absolute value of a maximum voltage difference in the voltage difference set is greater than or equal to a target threshold;

wherein the data compensation analog voltage is converted from a data compensation digital voltage by performing digital-to-analog conversion;

wherein when the voltage difference is negative, the data compensation digital voltage output to the corresponding organic light-emitting sub-pixel is larger than the original data digital voltage;

wherein when the voltage difference is positive, the data compensation digital voltage output to the corresponding organic light-emitting sub-pixel is smaller than the original data digital voltage;

wherein when the voltage difference is zero, the original data digital voltage is output to the corresponding organic light-emitting sub-pixel; and wherein the data compensation digital voltage is relative to the original data digital voltage, line loss, and conversion error.

2. The pixel compensation method according to claim 1, wherein the determining an actual driving digital voltage of each of the organic light-emitting sub-pixels in a detection row comprises:

acquiring an actual driving analog voltage output by each of the organic light-emitting sub-pixels in the detection row; and performing analog-to-digital conversion on the actual driving analog voltage to convert the actual driving analog voltage into the actual driving digital voltage.

3. The pixel compensation method according to claim 2, wherein the outputting a corresponding data compensation analog voltage to each of the organic light-emitting sub-pixels in the detection row when an absolute value of a maximum voltage difference in the voltage difference set is greater than or equal to a target threshold comprises:

calculating the data compensation digital voltage corresponding to each of the organic light-emitting sub-pixels in the detection row based on a compensation calculation formula:

$$DATA_{compensation}=DATA_{original}-k\times DATA_{difference}+m$$

where $DATA_{compensation}$ is the data compensation digital voltage, $DATA_{original}$ is the original data digital voltage corresponding to the organic light-emitting sub-pixel, $DATA_{difference}$ is the voltage difference, k is a first positive constant, and m is a second positive constant;

performing digital-to-analog conversion on the data compensation digital voltage to convert the data compensation digital voltage into the data compensation analog voltage; and outputting a matched data compensation analog voltage to each of the organic light-emitting sub-pixels in the detection row.

4. The pixel compensation method according to claim 3, wherein the first positive constant k is determined based on an adjustment of line loss during the acquisition of the actual driving analog voltage, and the second positive constant m is determined based on an adjustment of conversion error during the analog-to-digital conversion.

5. The pixel compensation method according to claim 3, wherein the first positive constant k is 1, and the second positive constant m is 0.

6. The pixel compensation method according to claim 1, wherein the pixel compensation method further comprises:

outputting an original data analog voltage to each of the organic light-emitting sub-pixels in the detection row, when the maximum voltage difference in the voltage difference set is less than the target threshold.

7. The pixel compensation method according to claim 1, wherein the plurality of rows of organic light-emitting sub-pixel groups are provided with a plurality of detection lines arranged at equal intervals.

8. A pixel compensation device, for compensating a display panel which comprises a plurality of rows of organic light-emitting sub-pixel groups comprising a plurality of organic light-emitting sub-pixels arranged in a column direction, wherein at least one of the plurality of rows of organic light-emitting sub-pixel groups is a detection row, wherein the pixel compensation device comprises:

a data driver configured to determine an actual driving digital voltage of each of the organic light-emitting sub-pixels in the detection row; and a timing controller configured to perform mean value calculation based on the actual driving digital voltage of each of the organic light-emitting sub-pixels in the detection row to determine an average driving digital voltage corresponding to the detection row; further configured to calculate a voltage difference between the actual driving digital voltage of each of the organic light-emitting sub-pixels in the detection row and the average driving digital voltage, and to count the voltage differences to form a voltage difference set;

wherein the data driver is further configured to output a corresponding data compensation analog voltage to each of the organic light-emitting sub-pixels in the detection row when an absolute value of a maximum voltage difference in the voltage difference set is greater than or equal to a target threshold;

wherein the data compensation analog voltage is converted from a data compensation digital voltage by performing digital-to-analog conversion;

wherein when the voltage difference is negative, the data compensation digital voltage output to the corresponding organic light-emitting sub-pixel is larger than an original data digital voltage;

wherein when the voltage difference is positive, the data compensation digital voltage output to the corresponding organic light-emitting sub-pixel is smaller than the original data digital voltage;

wherein when the voltage difference is zero, the original data digital voltage is output to the corresponding organic light-emitting sub-pixel; and wherein the data compensation digital voltage is relative to the original data digital voltage, line loss, and conversion error.

9. The pixel compensation device according to claim 8, wherein the data driver comprises an analog-to-digital converter configured to acquire an actual driving analog voltage output by each of the organic light-emitting sub-pixels in the detection row, and to perform analog-to-digital conversion on the actual driving analog voltage to convert the actual driving analog voltage into the actual driving digital voltage; and wherein the timing controller further is configured to calculate the data compensation digital voltage corresponding to each of the organic light-emitting sub-pixels in the detection row based on a compensation calculation formula of $DATA_{compensation}=DATA_{original}-k\times DATA_{difference}+m$, where $DATA_{compensation}$ is the data compensation digital voltage, $DATA_{original}$ is the original data digital voltage corresponding to the organic light-emitting sub-pixel, $DATA_{difference}$ is the voltage difference, k is a first positive constant, and m is a second positive constant; and wherein the data driver further comprises a digital-to-analog converter connected to the timing controller and configured to perform digital-to-analog conversion on the data compensation digital voltage to convert the data compensation digital voltage into the data compensation analog voltage, and to output a matched data compensation analog voltage to each of the organic light-emitting sub-pixels in the detection row.

10. The pixel compensation device according to claim 9, wherein the first positive constant k is determined based on an adjustment of line loss during the acquisition of the actual driving analog voltage, and the second positive constant m is determined based on an adjustment of conversion error during the analog-to-digital conversion.

11. The pixel compensation device according to claim 9, wherein the first positive constant k is 1, and the second positive constant m is 0.

12. The pixel compensation device according to claim 8, wherein the data driver is further configured to output an original data analog voltage to each of the organic light-emitting sub-pixels in the detection row, when the maximum voltage difference in the voltage difference set is less than the target threshold.

13. The pixel compensation device according to claim 8, wherein the plurality of rows of organic light-emitting sub-pixel groups are provided with a plurality of detection lines arranged at equal intervals.

14. A display device comprising:

a display panel comprising a plurality of rows of organic light-emitting sub-pixel groups comprising a plurality of organic light-emitting sub-pixels arranged in a column direction, wherein at least one of the plurality of rows of organic light-emitting sub-pixel groups is a detection row;

a data driver connected to the organic light-emitting sub-pixel, and configured to determine an actual driving digital voltage of each of the organic light-emitting sub-pixels in the detection row; and a timing controller connected to the organic light-emitting sub-pixel, wherein the timing controller is configured to perform mean value calculation based on the actual driving digital voltage of each of the organic light-emitting sub-pixels in the detection row to determine an average driving digital voltage corresponding to the detection row; further configured to calculate a voltage difference between the actual driving digital voltage of each of the organic light-emitting sub-pixels in the detection row and the average driving digital voltage, and to count the voltage differences to form a voltage difference set; and further configured to calculate a corresponding data compensation analog voltage to each of the organic light-emitting sub-pixels in the detection row when an absolute value of a maximum voltage difference in the voltage difference set is greater than or equal to a target threshold;

wherein the data driver is further configured to perform digital-to-analog conversion on the data compensation digital voltage to convert the data compensation digital voltage into the data compensation analog voltage, and to output a matched data compensation analog voltage to each of the organic light-emitting sub-pixels in the detection row;

wherein the data compensation analog voltage is converted from a data compensation digital voltage by performing digital-to-analog conversion;

wherein when the voltage difference is negative, the data compensation digital voltage output to the corresponding organic light-emitting sub-pixel is larger than an original data digital voltage;

wherein when the voltage difference is positive, the data compensation digital voltage output to the corresponding organic light-emitting sub-pixel is smaller than the original data digital voltage;

wherein when the voltage difference is zero, the original data digital voltage is output to the corresponding organic light-emitting sub-pixel; and wherein the data compensation digital voltage is relative to the original data digital voltage, line loss, and conversion error.

15. The display device according to claim 14, wherein the data driver comprises an analog-to-digital converter and a digital-to-analog converter respectively connected to the timing controller, wherein the digital-to-analog converter is configured to perform digital-to-analog conversion on the data compensation digital voltage or the original data digital voltage to convert the data compensation digital voltage or the original data digital voltage into the data compensation analog voltage or an original data analog voltage.

16. The display device according to claim 15, wherein the organic light-emitting sub-pixel comprises a data writing transistor, a driving transistor, a compensation transistor, a storage capacitor and an organic light-emitting diode;

wherein a first terminal of the data writing transistor is connected to the digital-to-analog converter through a data line for receiving the data compensation analog voltage or the original data analog voltage output by the digital-to-analog converter;

a control terminal of the data writing transistor is connected to a gate driver through a first scan line for receiving a first scan signal provided by the first scan line;

a second terminal of the data writing transistor, a first terminal of the storage capacitor and a control terminal of the driving transistor are connected to a first node;

a second terminal of the storage capacitor and a first terminal of the driving transistor are connected to a first power signal terminal for receiving the first power signal provided by the first power signal terminal;

a second terminal of the driving transistor, a first pole of the organic light-emitting diode and a first terminal of the compensation transistor are connected to a second node;

a second pole of the organic light-emitting diode is connected to a second power supply signal terminal for receiving a second power supply signal provided by the second power supply signal terminal;

a control terminal of the compensation transistor is connected to the gate driver through a second scan line for receiving a second scan signal provided by the second scan line, and a second terminal of the compensation transistor is connected to the analog-to-digital converter through a compensation line; and wherein the analog-to-digital converter is configured to acquire an actual driving analog voltage at the second node through the compensation line when the data writing transistor and the compensation transistor are respectively turned on in response to the first scan signal and the second scan signal, and perform analog-to-digital conversion on the actual driving analog voltage to convert the actual driving analog voltage into the actual driving digital voltage.

17. The display device according to claim 14, wherein the plurality of rows of organic light-emitting sub-pixel groups are provided with a plurality of detection lines arranged at equal intervals.

18. The display device according to claim 14, wherein the data compensation digital voltage is calculated by a compensation calculation formula:

$$DATA_{compensation}=DATA_{original}-k\times DATA_{difference}+m$$

where $DATA_{compensation}$ is the data compensation digital voltage, $DATA_{original}$ is the original data digital voltage corresponding to the organic light-emitting sub-pixel, $DATA_{difference}$ is the voltage difference, k is a first positive constant, and m is a second positive constant.

19. The display device according to claim 18, wherein the first positive constant k is determined based on an adjustment of line loss during the acquisition of the actual driving analog voltage, and the second positive constant m is determined based on an adjustment of conversion error during the analog-to-digital conversion.

20. The display device according to claim 18, wherein the first positive constant k is 1, and the second positive constant m is 0.

* * * * *